United States Patent [19]

Monroe et al.

[11] Patent Number: 5,853,541
[45] Date of Patent: Dec. 29, 1998

[54] DEGRADABLE COTTON BASE CELLULOSIC AGRICULTURAL MAT

[75] Inventors: Stephen H. Monroe, Memphis, Tenn.; James A. Goettmann; Gerald A. Funk, both of North East, Pa.

[73] Assignee: International Paper Company, Tuxedo Park, N.Y.

[21] Appl. No.: 671,874

[22] Filed: Jun. 28, 1996

Related U.S. Application Data

[63] Continuation-in-part of Ser. No. 386,487, Feb. 10, 1995, Pat. No. 5,532,298.

[51] Int. Cl.$^6$ .......................... D21F 11/00; D21H 13/00; D21H 17/00; D21H 21/00
[52] U.S. Cl. .......................... 162/141; 162/142; 162/147; 162/148; 162/158; 162/164.6; 47/9; 47/28.1; 47/32
[58] Field of Search .................... 162/158, 141, 162/142, 147, 148, 164.6; 47/9, 28.1, 32

[56] References Cited

U.S. PATENT DOCUMENTS

| | | | |
|---|---|---|---|
| 3,812,615 | 5/1974 | Jamison | 47/9 |
| 3,998,006 | 12/1976 | Riedel | 47/9 |
| 4,214,034 | 7/1980 | Kodera et al. | 428/315 |
| 4,283,880 | 8/1981 | Fjeldsa | 47/56 |
| 4,481,075 | 11/1984 | Dailly et al. | 162/145 |
| 4,481,242 | 11/1984 | Fletcher | 428/136 |
| 4,538,531 | 9/1985 | Wong | 111/1 |
| 4,790,907 | 12/1988 | Mallen et al. | 162/157.1 |
| 4,818,585 | 4/1989 | Shipp, Jr. | 428/198 |
| 4,867,526 | 9/1989 | Arroyo | 350/96.23 |
| 4,896,453 | 1/1990 | Jacob | 47/9 |
| 4,920,692 | 5/1990 | Kitamura et al. | 47/9 |
| 4,963,230 | 10/1990 | Kawase et al. | 162/129 |
| 5,000,933 | 3/1991 | McCray | 423/334 |
| 5,021,285 | 6/1991 | Ohe et al. | 428/195 |
| 5,076,008 | 12/1991 | Arroyo | 47/28.1 |
| 5,082,500 | 1/1992 | Nachtman et al. | 106/900 |
| 5,160,582 | 11/1992 | Takahashi | 162/117 |
| 5,163,247 | 11/1992 | Weber et al. | 47/9 |
| 5,191,734 | 3/1993 | Weber et al. | 47/9 |
| 5,308,663 | 5/1994 | Nakagawa et al. | 428/34.2 |
| 5,308,906 | 5/1994 | Taylor e al. | 524/398 |
| 5,382,610 | 1/1995 | Harada et al. | 524/35 |
| 5,470,434 | 11/1995 | Terasawa et al. | 162/117 |

FOREIGN PATENT DOCUMENTS

| | | |
|---|---|---|
| 0180648 | 11/1982 | Japan. |
| 2098500 | 2/1987 | Japan. |

*Primary Examiner*—Nathan M. Nutter
*Attorney, Agent, or Firm*—Hoffman, Wasson & Gitler; Michael J. Doyle, Esq.

[57] ABSTRACT

A degradable agricultural mulch, mat or ground cover including cotton linters fibers, hardwood kraft pulp fibers, softwood kraft pulp fibers, and a water holdout material which is strong enough to be laid mechanically and is 100% photo- or biodegradable.

13 Claims, No Drawings

DEGRADABLE COTTON BASE CELLULOSIC AGRICULTURAL MAT

This application is a continuation-in-part application of Ser. No. 08/386,487, filed Feb. 10, 1995 (U.S. Pat. No. 5,532,298, issued Jul. 2, 1996).

BACKGROUND OF THE INVENTION

This invention relates to a degradable agricultural mat or ground covering with weed control and moisture control properties. Moisture and weed control properties are significant properties which must be addressed by a mat or ground cover.

Present day horticulture for growing field crops varies greatly based on climatic conditions, swell conditions, and types of crops being planted. State-of-the-art techniques being practiced widespread involve the use of a ground mat primarily used for weed control and moisture retention in the soil.

Examples of ground mats used for these purposes can be categorized into two categories. The first and more widely used is a mat produced from extruded high density polyethylene. The mat may or may not contain pigmentation to give the fabric opacity. High opacity is necessary in weed control. The closed high density polyethylene mat acts as an excellent moisture barrier for retaining water in the soil.

The high density polyethylene film is non-degradable and must either be physically removed from the field after harvest, or it can be tilled under. Tilling the film under is less satisfactory because it tends not to disperse in the soil but remains for many seasons in long, wide strips which interfere with cultivation in the following seasons.

A second type of fabric for agricultural matting has been produced from 100% cellulosic fibers. This mat does not contain cotton linters as an integral structural component, contains a black pigment for opacity and is totally retillable after harvest, leaving no residual fabric. The cellulose structure is 100% biodegradable with the exception of the black pigment. This particular mat biodegrades too quickly in areas with extended single growing seasons. The mat or ground cover is too weak to be mechanically laid. Further, the mat is deficient in that it breaks apart before the crops are ripe, and allows some weed plants to compete with the crop plants. In addition, the mat does an inefficient job of retaining ground moisture.

U.S. Pat. No. 5,021,285, Ohe et al, proposes a non-woven sheet for agricultural use made of a hydrophobic non-woven fabric subjected to hydrophilic treatment which a surfactant is applied to at least part of the surface of the hydrophobic non-woven fabric, the sheet being characterized in that the hydrophilic treatment creates channels that allow water to pass through the obverse surface of the non-woven fabric to the underside thereof in that the percentage of water retention is within the range of 100–300 wt %. The polymer nature of the fabric prevents it from degrading and as such, the sheet encounters the same problems as a high density polyethylene polymer matting cover.

U.S. Pat. No. 4,818,585, Shipp, Jr., discloses an agricultural protective fabric comprised of two layers of a non-degradable material and a degradable melt blown layer. The fabric is essentially a cover for growing plants and the fabric allows the transmission of air, water, and light.

The inventive new degradable agricultural ground cover or mat embodied by the invention combines both the longevity of a film, the moisture holding qualities of the film, along with the degradability of pure cellulose.

The present invention relates to a degradable agricultural ground cover mulch or mat with weed control and moisture control properties, as good as an extruded polymer film such as high density polyethylene. The degradable agricultural mat or cover is 100% photo- and biodegradable. Further, the material lasts from 8–12 weeks before serious photo- and biodegradability occurs, allowing the crops time to insure and produce before losing the effect of the mat. Weed control is as good with this material as with an extruded high density polyethylene web. Additionally, moisture control is as good as with an extruded high density polyethylene matting and no leachates are solubilized from the sheet into the ground water. The sheet totally disappears with plowing and tilling, becoming a soil extender until complete degradation occurs. The mat is structurally strong enough to be mechanically laid.

It is therefore an object of the present invention to provide an agricultural ground cover or mat which will have sufficient strength, barrier properties, and be strong enough to be applied mechanically onto the soil while also having a sufficient degree of photo- and biodegradability.

DETAILED DESCRIPTION OF THE INVENTION

While the invention will be described in connection with the preferred embodiment, it is to be understood that it is not intended to limit the invention to that embodiment. Related alternatives, modifications, and equivalences may be included within the spirit and scope of the invention as defined by the appended claims are contemplated.

The invention is directed to an agricultural mat or mulch formulation which can last from 8–12 weeks and be 100% degradable. The mat is composed of cotton linters, hardwood craft pulp, soft wood craft pulp, and a water holdout material. The three types of fibers are refined either together or separately to a Canadian Standard Freeness of 250 cc. The water holdout material is then added inline at the recommended addition level. A water holdout material is a material which "holds out" water by inhibiting its absorption into the mat. The sheet is formed on regular papermaking equipment. The sheet may be wet pressed and dried using steam cans, infrared heating, or hot air heating. No surface treatment is required, although starch or some other natural occurring protein may be used if desired. A preferred embodiment of the resultant matting of has the following illustrative physical properties:

| | |
|---|---|
| Basis Weight (1.300 sq. ft.) | 24.0 |
| Caliper (mils) | 6.7 |
| Porosity, Gurley (sec/100 cc) | 25 |
| Hercules Size Test (sec) | 0.2 |
| Stiffness, Gurley (mg) (md/cd) | 323.6/149.9 |
| Mullen (psi) | 40 |
| Elmendorf Tear (md/cd) | 106/123 |
| Fold (md/cd) | 177/375 |
| Tensile (1.b/in.) (md/cd) | 35.6/18.1 |
| Wet Tensile (lb./in.) (md/cd) | 5.2/3.6 |
| Elongation (%) (md/cd) | 2.4/7.3 |
| T.E.A. (ft. lb./sq. ft.) (md/cd) | 9.9/18.0 |
| Opacity, % | 76.9 |

A preferred formulation includes 24.6 wt % cotton linters fibers, 14.9 wt % hardwood kraft pulp fibers, 59.5 wt % softwood kraft pulp fibers, and 1 wt % water holdout material.

The cotton linters component can range from 15 wt % to 50 wt % of the overall formulation. Further, the hardwood kraft pulp fibers component can range from 10 wt % to 25 wt % of the overall composition. The softwood kraft pulp component can range from 25 wt % to 75 wt % of the overall formulation.

Water holdout materials such as epichlorohydrin, an alkene ketene dimer, or alkenyl succinic anhydride are the preferred holdout materials for the formulation.

Refining of the fibers may exceed the 250 cc Canadian Standard Freeness range, but it is preferred that the material have a Canadian Standard Freeness of no less than 250 cc.

The sheet may also contain all unbleached fibers or all bleached fibers, or any combination thereof.

Dyes or pigments may also be added to increase sheet opacity or change the natural beige coloring to attract or repel various insect species. Sheet opacity may vary between 70 and 100% and remain effective in preventing seed germination.

Sheet weight may also be varied. Material webbing less than 24 lbs. (13,000 sq.ft. basis), or 90 grams per square meter, will not possess enough strength to be mechanically installed; however, it will serve properly for manual installation. Therefore, this weight may be varied upon application.

Degradation or biodegradation will also be faster for the lighter weight webs than the heavier weight ones. The heavier the sheet, the longer it lasts in the field before complete degradation occurs. Other variations such as cutting the sheet or punching holes in it for crop planting may be done using any number of commercial mechanized equipment or manual tools such as bulb planters.

The preferred embodiment of the invention can contain cotton linters such as Buckeye Cellulose 503, hardwood kraft pulp such as produced by the Thilmany Division of International Paper Company of Memphis, Tenn., and softwood kraft pulp such as produced by the Riverdale Division of International Paper Company. Lastly, one can utilize, if desired, the water holdout materials sold by Hercules Inc. of Wilmington, Del., epichlorohydrin (Kymene 557H) or alkene ketene dimer (Hercon 75 AKD).

What is claimed is:

1. A degradable ground cover comprising cotton linters, hardwood kraft pulp, softwood kraft pulp, and a water holdout material.

2. A degradable ground cover as claimed in claim 1, wherein said water holdout material is an alkene ketene dimer, epichlorohydrin or an alkenyl succinic anhydride.

3. A degradable ground cover as claimed in claim 1, wherein said cotton linters is present from 15–50 percent by weight of the cover.

4. A degradable ground cover as claimed in claim 1, wherein said hardwood kraft pulp or softwood kraft pulp is bleached pulp, unbleached pulp, or a combination thereof.

5. A degradable ground cover as claimed in claim 1, wherein the Canadian Standard Freeness is $\geq 250$ cc.

6. As degradable ground cover as claimed in claim 1, further comprising a pigment or dye.

7. A degradable ground cover as claimed in claim 1, wherein said hardwood kraft pulp is present from 10–25% by weight of the cover.

8. A degradable ground cover as claimed in claim 1, wherein said softwood kraft pulp is present from 25–75% by weight of the cover.

9. A degradable ground cover as claimed in claim 1, wherein said cotton linter fibers is present at 24.6% by weight, said hardwood kraft pulp fibers is present at 14.9% by weight, said softwood kraft pulp fibers is present at 59.5% by weight and said water holdout material is present at 1% by weight.

10. A degradable agricultural ground covering comprising cotton linters, hardwood kraft pulp, softwood kraft pulp and a water holdout material selected from the group, consisting of alkene ketene dimer and alkenyl succinic anhydride.

11. A degradable ground cover as claimed in claim 10, wherein said cotton linters is present from 15–50 percent by weight of the cover.

12. A degradable ground cover as claimed in claim 10, wherein said hardwood kraft pulp is present from 10–25% by weight of the cover.

13. A degradable ground cover as claimed in claim 10, wherein said softwood kraft pulp is present from 25–75% by weight of the cover.

* * * * *